United States Patent [19]

Csik

[11] Patent Number: 5,577,758

[45] Date of Patent: Nov. 26, 1996

[54] CASTOR INDEPENDENT STEERING ARM MOUNTING

[76] Inventor: Frank V. Csik, 3465 Redpath St. Apr. 1006, Montreal, Quebec, Canada, H3G 2G8

[21] Appl. No.: 539,429

[22] Filed: Oct. 5, 1995

Related U.S. Application Data

[63] Continuation-in-part of Ser. No. 302,334, Sep. 8, 1994, abandoned.

[51] Int. Cl.[6] ..................................................... B60G 3/00
[52] U.S. Cl. ........................................... 280/673; 280/691
[58] Field of Search .................................... 280/673, 675, 280/672, 660, 696, 690, 691

[56] References Cited

U.S. PATENT DOCUMENTS 4,610,461  9/1986  Guzzetta ................................. 280/660

FOREIGN PATENT DOCUMENTS 2035307  1/1972  Germany ................................ 280/660

5-124535  5/1993  Japan ..................................... 280/691

Primary Examiner—Kenneth R. Rice

[57] ABSTRACT

There is provided a steering and suspension arrangement for "bump-steer" control wherein the steering arm is transformed into an articulated segment of either the upper or lower control linkage by substituting a universal joint for a corresponding spherical joint at the upright's pick-up point and thus creating a Hooke's type universal joint and attaching the upright to this assembly. This attachment of the upright to the universal joint is by means of bearings forming a laterally disposed axis integrated into the assembly enabling the upright to pivot freely about it without any effect on the steering arm and thus eliminating toe-in changes and "bump steer". The articulated steering arms eliminate tire scrub arising out of undesirable toe changes, and thus reduce the ensuing tire drag, and thus result in reduced tire wear and fuel consumption, as the wheels rise and drop with compression and extension strokes of the suspension. Conversely, reduced tire drag improves straight-line and cornering speeds.

11 Claims, 8 Drawing Sheets

CASTOR INDEPENDENT STEERING ARM MOUNTING

The present application is a continuation-in-part of application Ser. No. 08/302,334 filed Sep. 8, 1994.

FIELD OF THE INVENTION

The present invention relates to a steering and suspension mechanism for wheeled vehicles and more particularly, relates to a steering and suspension mechanism for bump steer control.

BACKGROUND OF THE INVENTION

It is known in the art that "bump steer" is a problem in that toe-in changes during vertical displacement of the wheel are undesirable and cause a change in the dynamic behavior of the vehicle. While particularly important for racing vehicles, it is also undesirable in conventional automobiles. On vehicles equipped with independent suspension, it is common practice to define side view swing arm geometry by appropriately arranging the control arms of each wheel in a way that causes their axes to converge at some instantaneous point(s) yielding a desired percentage of anti-dive/lift by inducing vector forces to counter weight transfer arising out of acceleration and braking. In normal practice, uprights attach to the outboard end of control arms via spherical joints, while the steering arms are rigidly attached to the uprights. Strut type suspension systems utilize only a lower control linkage, as a telescoping strut integrated with the upright replaces the upper control linkage used in the SLA (short-long-arm) layout.

In a vehicle's front wheel steering system and/or the rear wheel toe-control system, it is common practice to have the steering arms rigidly attached to the uprights carrying the road wheels, for transferring directional input from the operator, or from said toe-control link.

In side elevation, the angle between a vertical and a straight line passing through the upright's spherical bearings is commonly referred to as castor angle. Since the rotational planes of associated control linkages intersect one another, the castor angle is subjected to incremental changes as the wheel drops and rises.

Since the tie-rod's inboard pivot is attached to an actuator, usually in the form of a rack or a link rod, which is firmly anchored to the chassis in both vertical and fore-and-aft planes, or as is the case in a rear suspension, the toe-control link's inboard end is attached to a fixed point on the chassis, a conventional steering arm has a drawback as any incremental change of the castor angle produces a corresponding change in the steering arm's slope, thereby inducing twist in the imaginary surface formed by the steering arm, the tie-rod and the control linkage causing toe-in changes in the wheel as it rises and drops.

It is of course necessary that the projected length of the steering arm, as measured on a reference plane, be held in check for minimizing undesirable toe-in changes during the suspension's compression and extension strokes in the presence of anti-dive/anti-squat geometry. To minimize changes in the instantaneous castor angle, it is customary to position the control linkage pivot axes at some convenient angle to the vehicle's longitudinal centre line, as observed in plan view. Arising out of this arrangement, the control linkage tips rotate on elliptical paths, as viewed in side elevation, hence the changes may only be minimized, but not eliminated.

SUMMARY OF THE INVENTION

It is an object of the present invention to provide a steering and suspension mechanism for wheeled vehicles which overcomes the above disadvantages.

According to one aspect of the invention, there is provided an interconnecting arrangement for a vehicle having an upright for mounting a wheel, a control linkage and a steering arm, wherein there is a first plane having mutually perpendicular X and Y axes in the plane and a Z axis perpendicular to the plane, the arrangement comprising a connecting member, the connecting member being connected to the steering arm, upright interconnecting means connecting the upright and at least one of said steering arm and said connecting member to permit pivotable movement of the upright with respect to the interconnecting means about the Y axis, and control linkage interconnecting means connecting the control linkage and the connecting member, the control linkage interconnecting means permitting movement of the control linkage interconnecting means about the Z axis.

In one embodiment, there is provided an arrangement wherein the connecting member has a first pair of coaxially extending arms extending in the X axis, the steering arm terminating in a yoke having a pair of yoke arms, the arms being rotatably connected to the coaxial arms.

In a preferred embodiment, there is provided an arrangement wherein the connecting member has a second pair of coaxially extending arms extending in the Z axis direction, the control linkage terminating in a yoke having a pair of yoke arms, the yoke arms being rotatably connected to the second pair of coaxially extending arms to permit movement of the control linkage about the Z axis.

Preferably, the upright interconnecting means interconnect the upright to the yoke of the steering arm.

The upright interconnecting means may comprise an arm extending from the connecting member in the Y axis direction with the upright being pivotably connected to the arm extending in the Y axis.

In a further embodiment, there is provided an arrangement wherein the connecting member is a trunnion having a first pair of coaxially extending arms extending in the X axis, a second pair of coaxially extending arms extending in the Z axis, the upright interconnecting means comprising a yoke member having a pair of yoke arms rotatably journalled with respect to the first pair of coaxial arms, the control linkage interconnecting means comprising a yoke having a pair of yoke arms rotatably journalled with respect to the second pair of coaxially extending arms, the steering arm being connected to the trunnion.

In a further embodiment, there is provided an arrangement wherein the connecting member has a first pair of coaxially extending arms extending in the X axis direction and a further arm extending in the Y axis direction, the upright being pivotally connected to the further arm, the steering arm terminating in a double yoke structure, the first pair of coaxial arms being rotatably journalled in the double yoke structure, the control linkage interconnecting means terminating in a yoke having a pair of yoke arms, the yoke arms being rotatably journalled in the double yoke structure.

In a further embodiment, there is provided an arrangement wherein the connecting member has a first pair of coaxially extending arms extending in the X axis, the upright interconnecting means comprising a yoke having a pair of yoke arms adapted to receive the coaxial arms, the upright being pivotably connected to the yoke, a second pair of coaxial members extending from the connecting member in the Z axis, the control linkage interconnecting means comprising a trunnion having a pair of coaxial arms, the coaxial arms being rotatably journalled in the members extending in the Z axis direction.

In a further embodiment, there is provided an arrangement wherein the connecting member includes a pair of members extending outwardly in the Z axis direction, the control linkage interconnecting means comprising a trunnion having a pair of coaxial arms, the coaxial arms being rotatably journalled within the members extending in the Z axis direction.

In a further embodiment, there is provided an arrangement wherein the connecting member has a first pair of coaxially extending arms extending in the X axis and a single arm extending in the Y axis, the upright being pivotably connected to the arm extending in the Y axis, the steering arm being connected to the connecting member, a further member extending at least partially about the connecting member, the further member being adapted to rotatably journal the coaxial arms in the X axis, the further member having a pair of arms extending in the Z axis, the control linkage terminating in a yoke having a pair of yoke arms, the coaxial arms extending in the Z axis direction being rotatably journalled in the yoke arms of the control linkage.

In a further embodiment, there is provided an arrangement wherein the connecting member has a first pair of coaxially extending arms extending in the X axis and an arm extending from the connecting member in the Y axis, the upright being pivotably connected to the arm extending in the Y axis, the steering arm being connected to the connecting member, a further member extending at least partially about the connecting member, the control linkage terminating in a yoke having a pair of yoke arms, the further member being adapted to rotatably journal the coaxially extending arms in the X axis, and also rotatably journal the yoke arms in the Z axis.

The above arrangements transform the steering arm into an articulated segment of either the upper or lower control linkage, by substituting a universal joint for the corresponding spherical joint at the upright's pick-up point, and thus creating a Hooke's type universal joint, and attaching the upright to this assembly.

Attachment of the upright to the universal joint is via bearings forming a laterally disposed axis integrated into the assembly, enabling the upright to pivot freely about it without any effect on the steering arm. The steering arm, thus freed from the upright's angular changes in one plane, no longer reacts to instantaneous castor angle changes to provide a "Castor Independent Steering Arm Mounting". In this layout, the length of the steering arm, as projected on an imaginary chassis mounted reference plane, remains constant throughout the suspension's vertical range of travel, thus eliminating toe-in changes, and therefore eliminating "bump-steer".

While the universal joint assembly may be arranged in any number of ways, the steering arm is free to pivot only about the cross shaped universal joint's upended axis.

BRIEF DESCRIPTION OF THE DRAWINGS

Having thus generally described the invention, reference will be made to the accompanying drawings illustrating embodiments thereof, in which.

DESCRIPTION OF THE PREFERRED EMBODIMENTS

Figure 1:
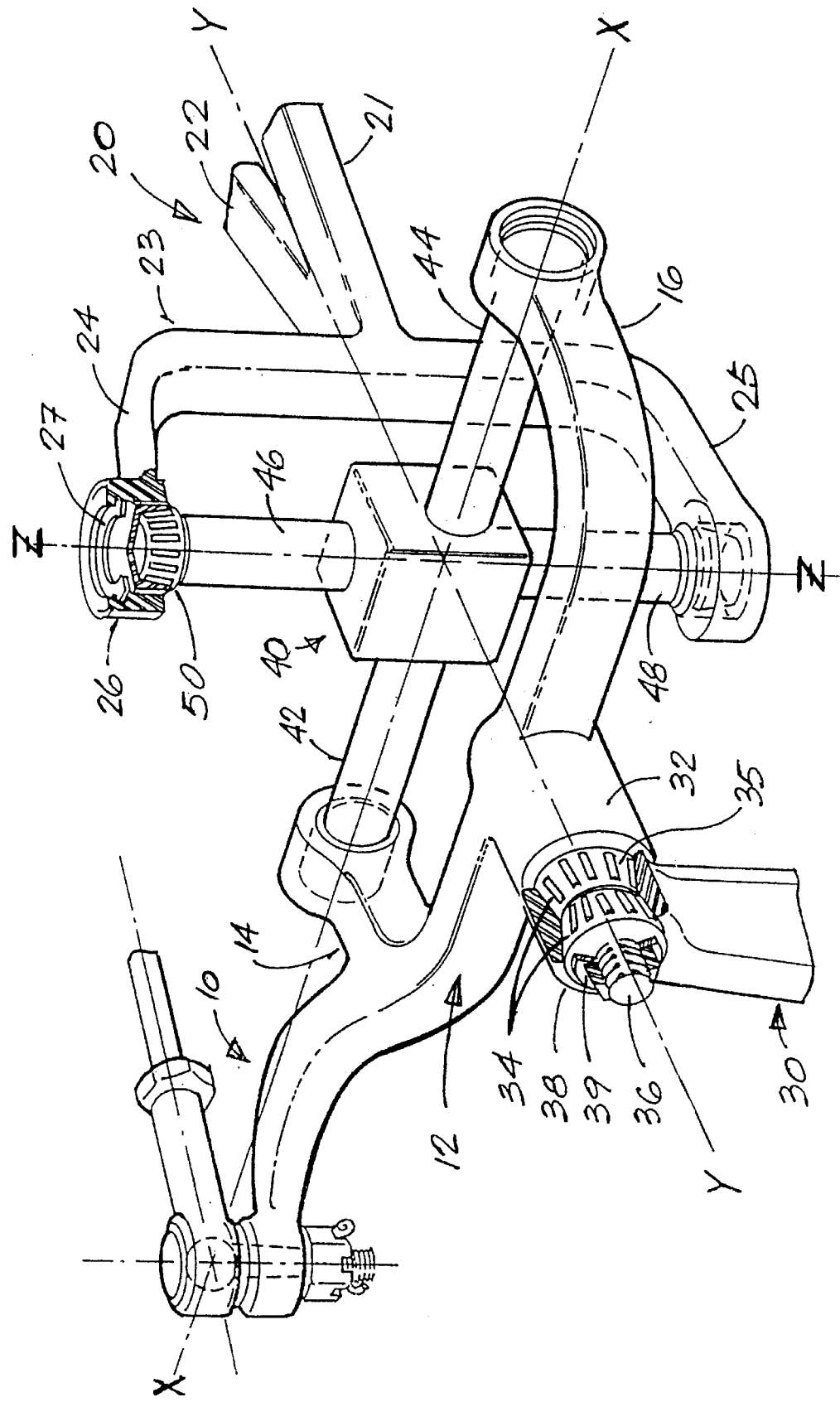
FIG. 1 is a perspective view, partially in cutaway, of one embodiment of an interconnecting arrangement for a vehicle steering and suspension mechanism.

Referring to the drawings in greater detail and by reference characters thereto, in FIG. 1 there is illustrated a steering and suspension mechanism which includes a steering arm 10, a control linkage generally designated by reference numeral 20, a suspension upright 30, and connecting member or trunnion generally designated by reference numeral 40.

Steering arm 10 terminates in a yoke type arrangement designated by reference numeral 12 and which includes a first yoke arm 14 and a second yoke arm 16.

Trunnion 40 includes a first pair of coaxial arms 42 and 44 extending in an X axis direction. A second pair of coaxial arms 46 and 48 extend outwardly along the Z axis. As may be seen in FIG. 1, arm 46 terminates in a bearing generally designated by reference numeral 50. Member 48 terminates in a like bearing arrangement (not shown).

Control linkage 20, in the illustrated embodiment, includes a first arm 21 and a second arm 22 which together terminate in a yoke 23. Yoke 23 has a first yoke arm 24 terminating in a lug 26 which is mounted on arm 46 by means of a bearing 50. Retaining ring 27 may be provided in a conventional arrangement.

Yoke 23 also includes a second yoke arm 25 which is mounted on coaxial arm 48 in a manner similar to that described with respect to yoke arm 24.

Extending outwardly from yoke 12 is an interconnecting member 32 which has, proximate one end thereof, a bearing 35 which includes needle bearings 34 in a double row needle bearing. An end 38 of upright 30 is mounted in bearing 35 with a retaining ring 39 being provided about stub axle 36.

Figure 2:
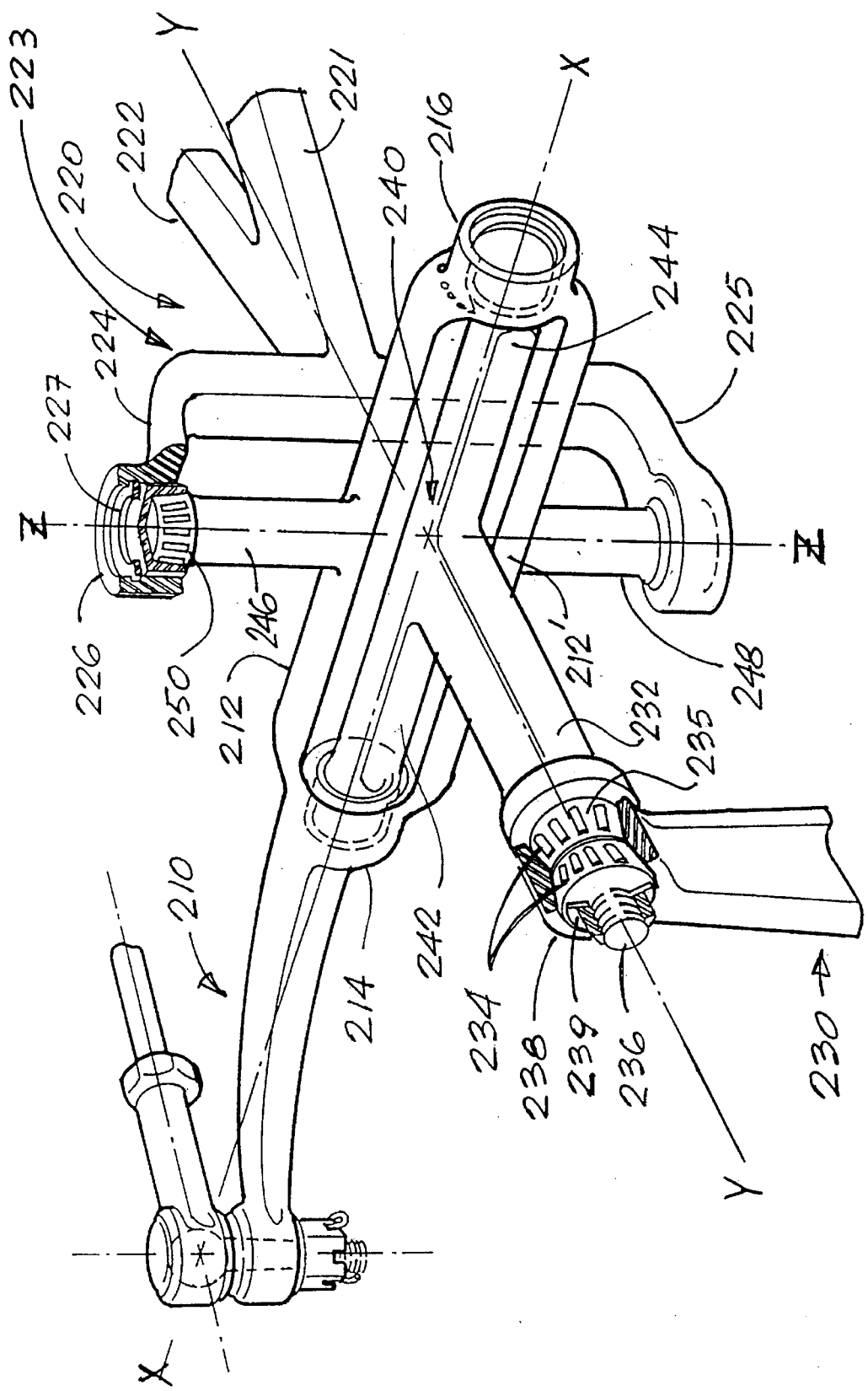
FIG. 2 is a perspective view, partially in cutaway, of a further embodiment of an interconnecting arrangement for a vehicle steering and suspension mechanism.

A further embodiment is illustrated in FIG. 2; similar reference numerals (in the 200's) are used for similar components. In this embodiment, there is a steering arm generally designated by reference numeral 210, a control linkage 220, a suspension upright 230 and a central connecting member 240.

In this embodiment, steering arm 210 terminates in a double yoke 212, 212' providing common yoke arm ends 214 and 216. Connecting member 240 includes a first pair of coaxial arms 242 and 244 extending in the X axis and a second pair of coaxial arms 246 and 248 extending outwardly along the Z axis. Arms 242 and 244 are pivotably connected in yoke arm ends 214 and 216.

Connecting member 240 also includes an interconnecting member 232 which at its free end 238 includes a bearing 235 having needle bearings 234 mounted therein in a double row needle bearing arrangement. A retaining ring 239 is provided about stub axle 236.

Control linkage 220, as in the previously described embodiment, has first and second arms 221 and 222 respectively and which terminate in a yoke 223. A first yoke arm 224 terminates in a lug 226 which is mounted on coaxial arm 246 by means of a bearing 250. A retaining ring 227 is provided. Similarly, second yoke arm 225 is mounted on coaxial arm 248.

Figure 3:
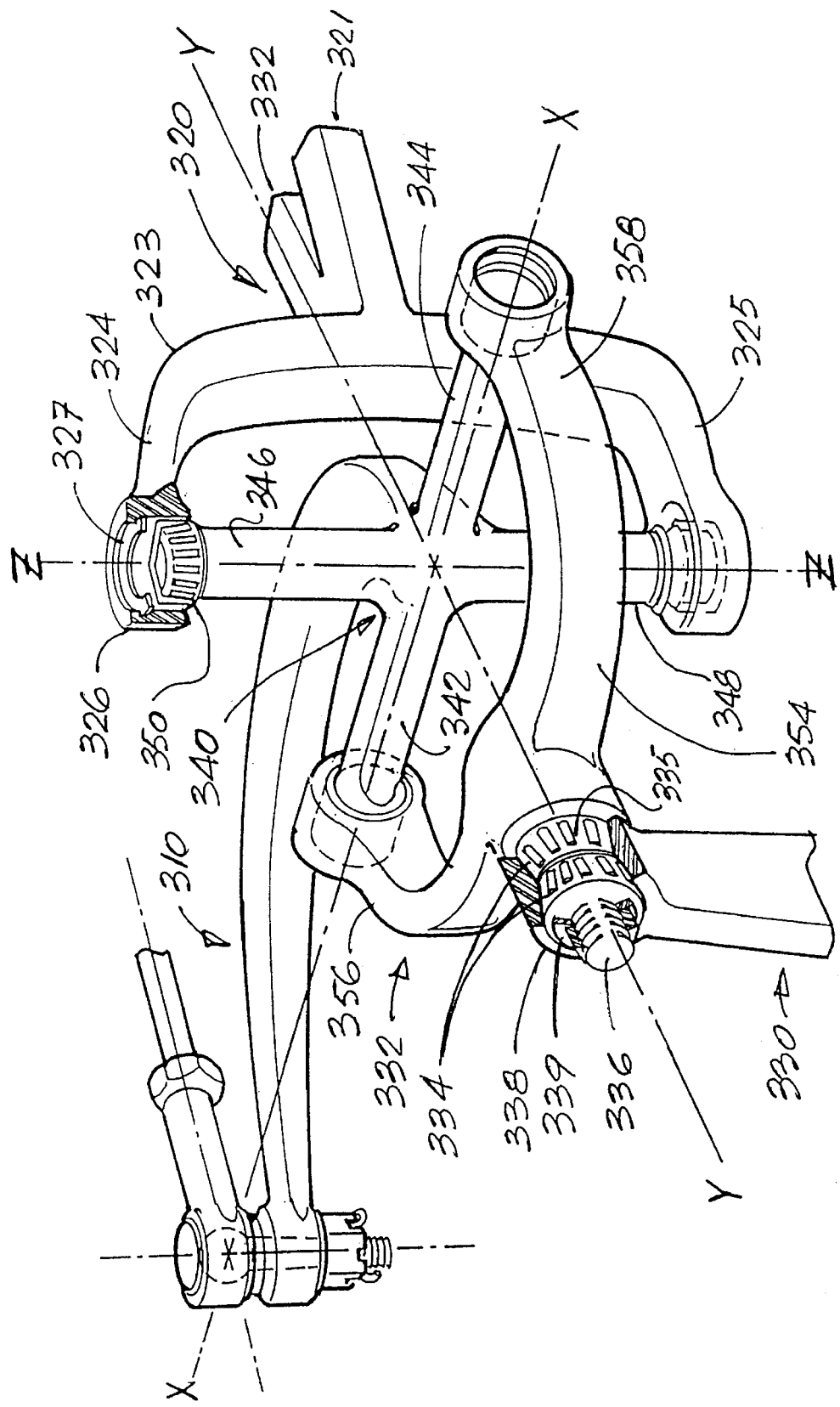
FIG. 3 is a is a perspective view, partially in cutaway of one embodiment of an interconnecting arrangement for a vehicle steering and suspension mechanism.

In the embodiment of FIG. 3, reference numerals in the 300's are utilized for similar components. As may be seen, there is provided a cross shaped trunnion 340 having a first pair of coaxial arms 342, 344 and a second pair of coaxial arms 346, 348.

In this embodiment, steering arm 310 is connected directly to trunnion 340.

As in the previously described embodiments of FIGS. 1 and 2, control linkage 320 includes control arms 321 and 322 and terminate in a yoke 323. Yoke arm 324 has a lug 326 which is mounted on a bearing 350. A similar arrangement is provided for yoke arm 325.

In this embodiment, the connecting member or means 332 for suspension upright 330 comprises a yoke 354 having yoke arms 356 and 358. Yoke arms 356 and 358 are mounted on coaxial arms 342 and 344 respectively. As in the previously described embodiments, there is provided a double row needle bearing 335 having needle bearings 334 therein. An end 338 of upright 330 is mounted in bearing 335 while a retaining ring 339 is provided about stub axle 336.

Figure 4:
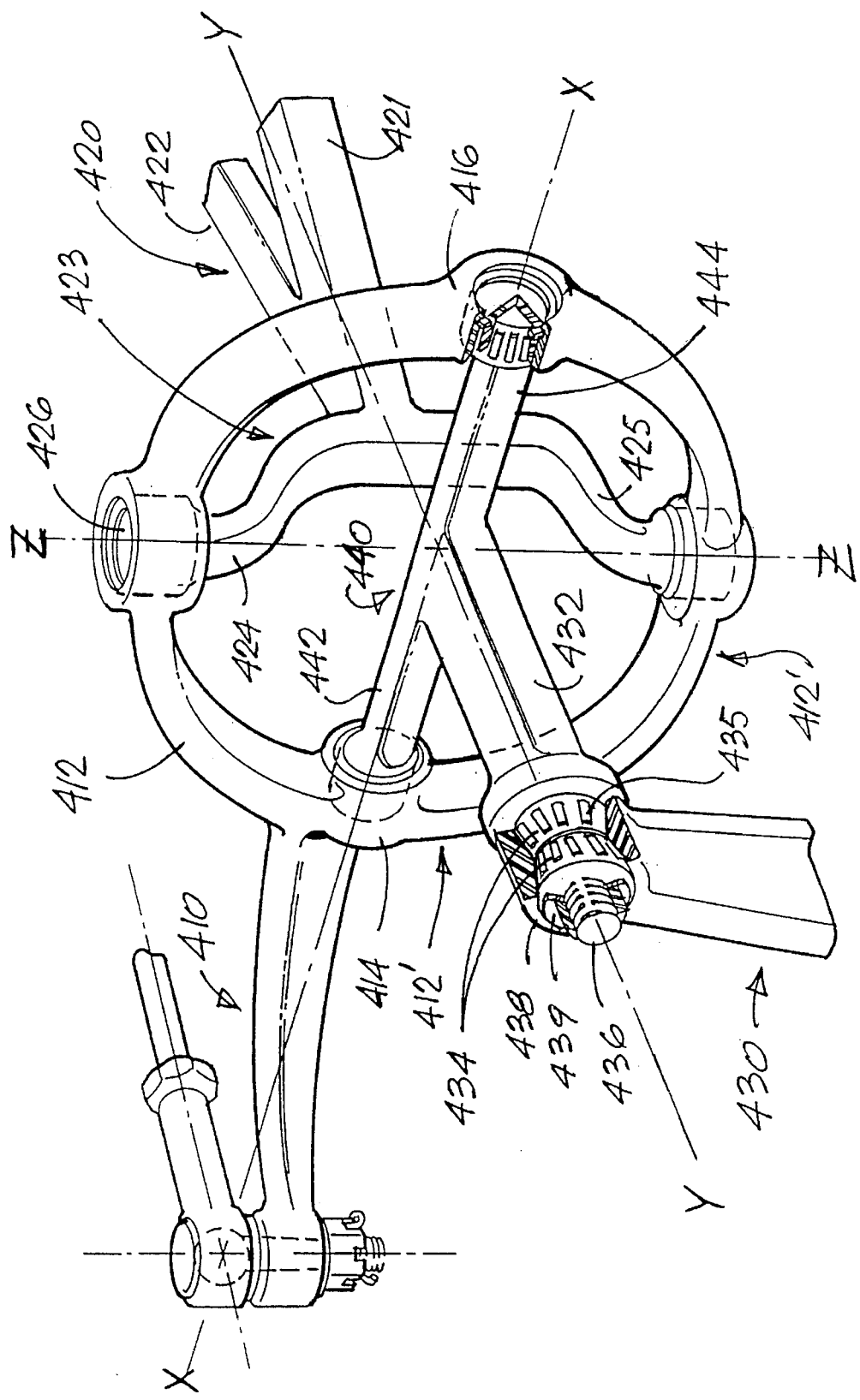
FIG. 4 is a perspective view, partially in cutaway, of one embodiment of an interconnecting arrangement for a vehicle steering and suspension mechanism.

In the embodiment illustrated in FIG. 4, (reference numerals in the 400's) steering arm 410 terminates in a double yoke arrangement somewhat similar to that of the embodiment of FIG. 2.

In greater detail, central connecting member 440 has a first pair of coaxial arms 442 and 444 with a further connecting arm 432 extending in the Y axis direction. Suspension upright 430 is mounted pivotably with respect to connecting member 432 as in the previously described embodiment (see FIG. 2).

As aforementioned, steering arm 410 has a first yoke 412 and a second yoke 412'. Yokes 412 and 412' have common arm ends 414 and 416 which are mounted on arms 442 and 444 respectively.

In this embodiment, control linkage 420 has a yoke 423 with yoke arms 424 and 425 which are mounted within yokes 412 and 412' of steering arm 410.

Figure 5:
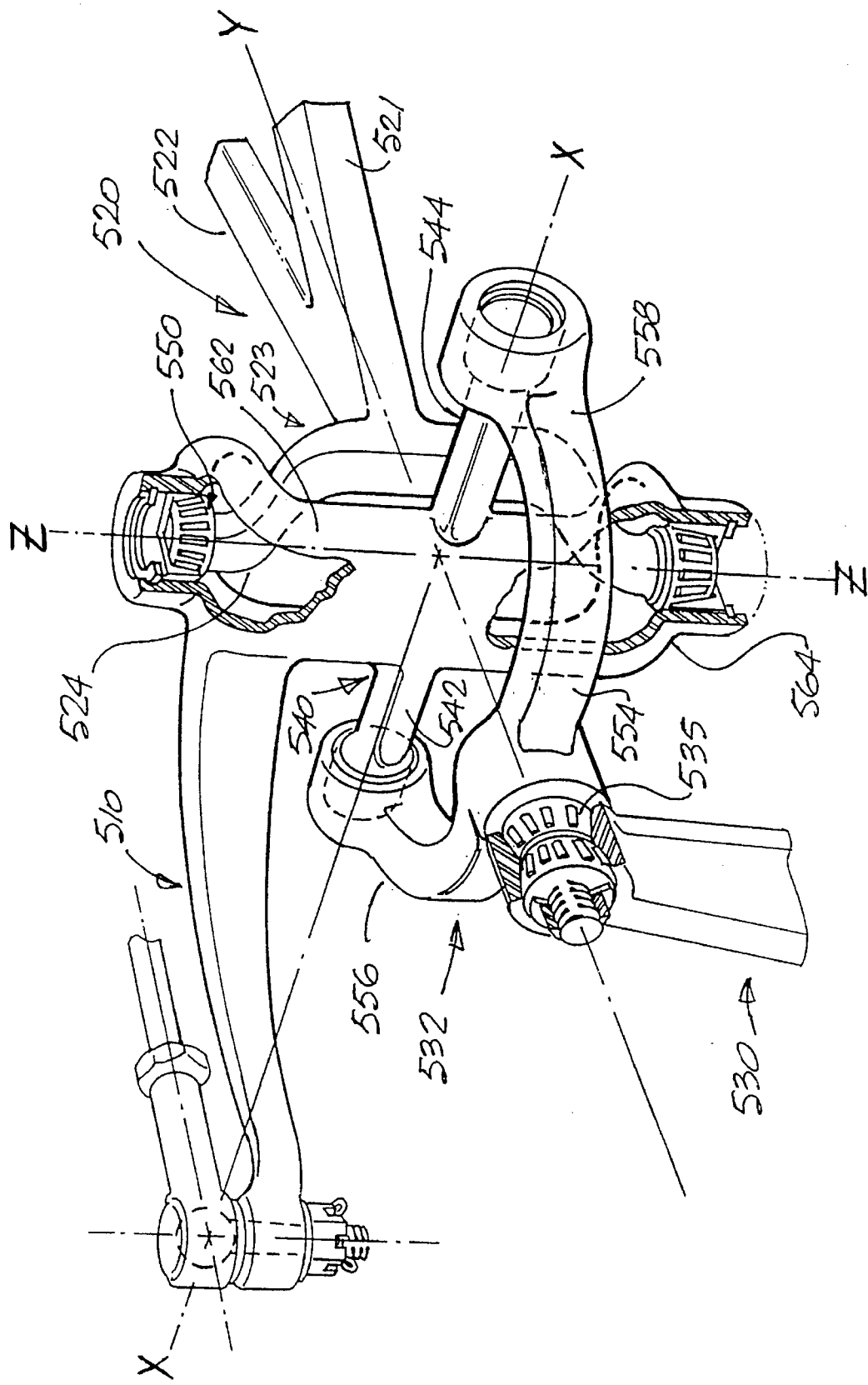
FIG. 5 is a perspective view, partially in cutaway, of one embodiment of an interconnecting arrangement for a vehicle steering and suspension mechanism.

Turning to the embodiment of FIG. 5, similar reference numerals in the 500's are used for similar components to those of the previously described embodiments.

In this embodiment, steering arm 510 is formed integrally with a vertical yoke/horizontal trunnion arrangement. In greater detail, steering arm 510 has a yoke like member having an upper yoke portion 562 and a lower yoke portion 564. It is formed integrally with connecting member which also has a pair of coaxial arms 542 and 544 extending in the X axis direction.

Suspension upright 530 is formed in a manner similar to that described with respect to FIG. 3. Thus, there is provided an interconnecting member 532 which is in the form of a yoke 554 having yoke arms 556 and 558 mounted on coaxial arms 542 and 544 respectively. Suspension upright 530 is mounted in bearing 535 as previously described in the embodiment of FIG. 3.

Control linkage 520 is formed and mounted in a manner similar to that described with respect to FIG. 4. Thus, a yoke 523 has an upper yoke arm 524 terminating in a bearing 550 and which is mounted in upper yoke portion 562 while the lower yoke arm of control linkage 520 is mounted in a similar bearing arrangement in lower yoke portion 564 of steering arm 510.

Figure 6:
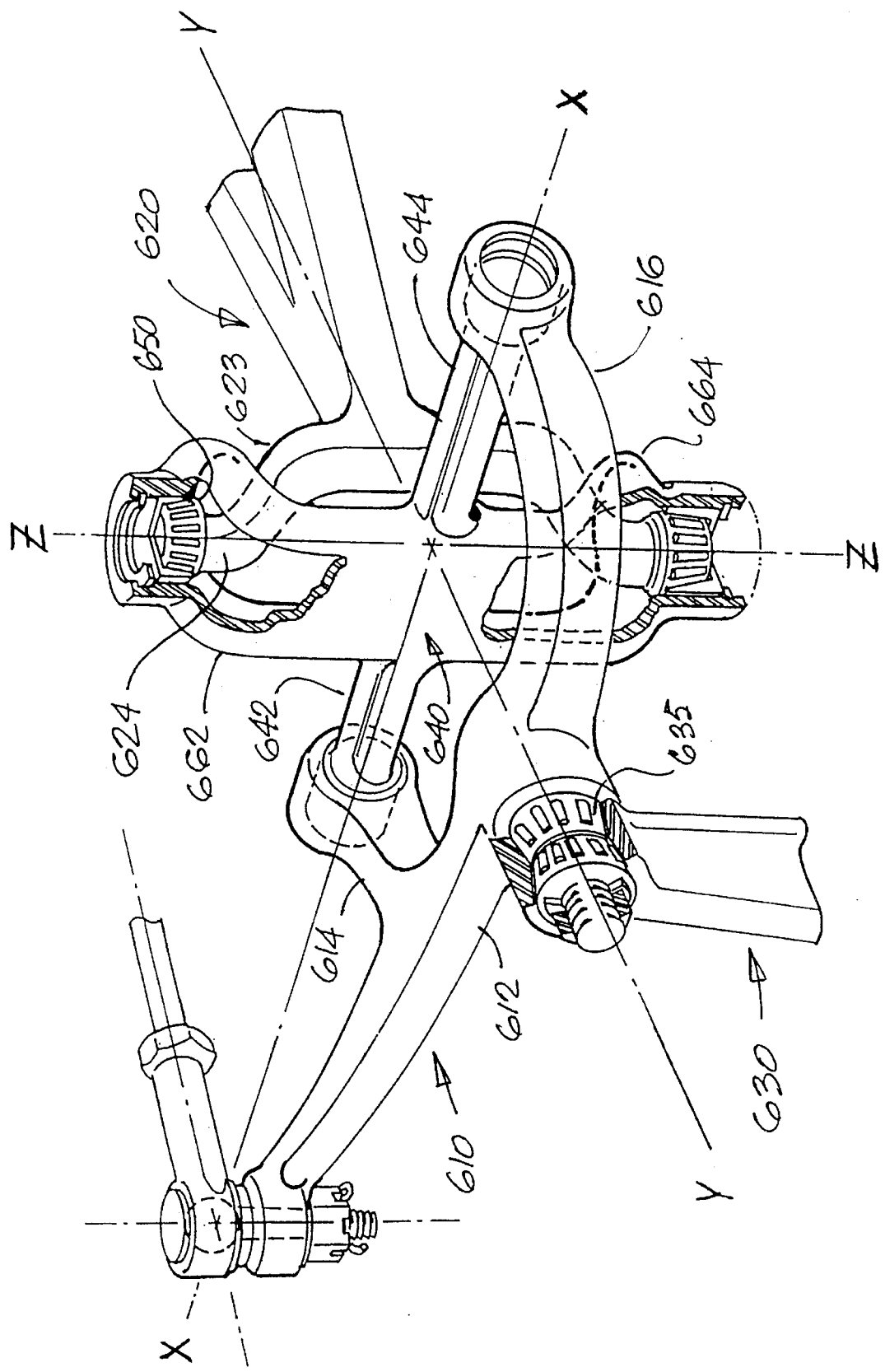
FIG. 6 is a perspective view, partially in cutaway, of one embodiment of an interconnecting arrangement for a vehicle steering and suspension mechanism.

A still further embodiment is shown in FIG. 6 and reference numerals in the 600's are used for similar components. This embodiment combines the arrangement of FIG. 1 and FIG. 5. Thus, there is provided a steering arm 610 having a yoke 612 and yoke arm members 614 and 616 mounted on coaxial arms 642 and 644 respectively. Connecting member 640 has a vertical yoke arrangement similar to that of FIG. 5 with an upper yoke portion 662 and a lower yoke portion 664. Control linkage 620 is mounted in a manner similar to that described with respect to FIG. 5—i.e. a yoke 623 has an upper yoke arm 624 mounted by means of bearing 650 in upper yoke portion 662 of connecting member 640.

Figure 7:
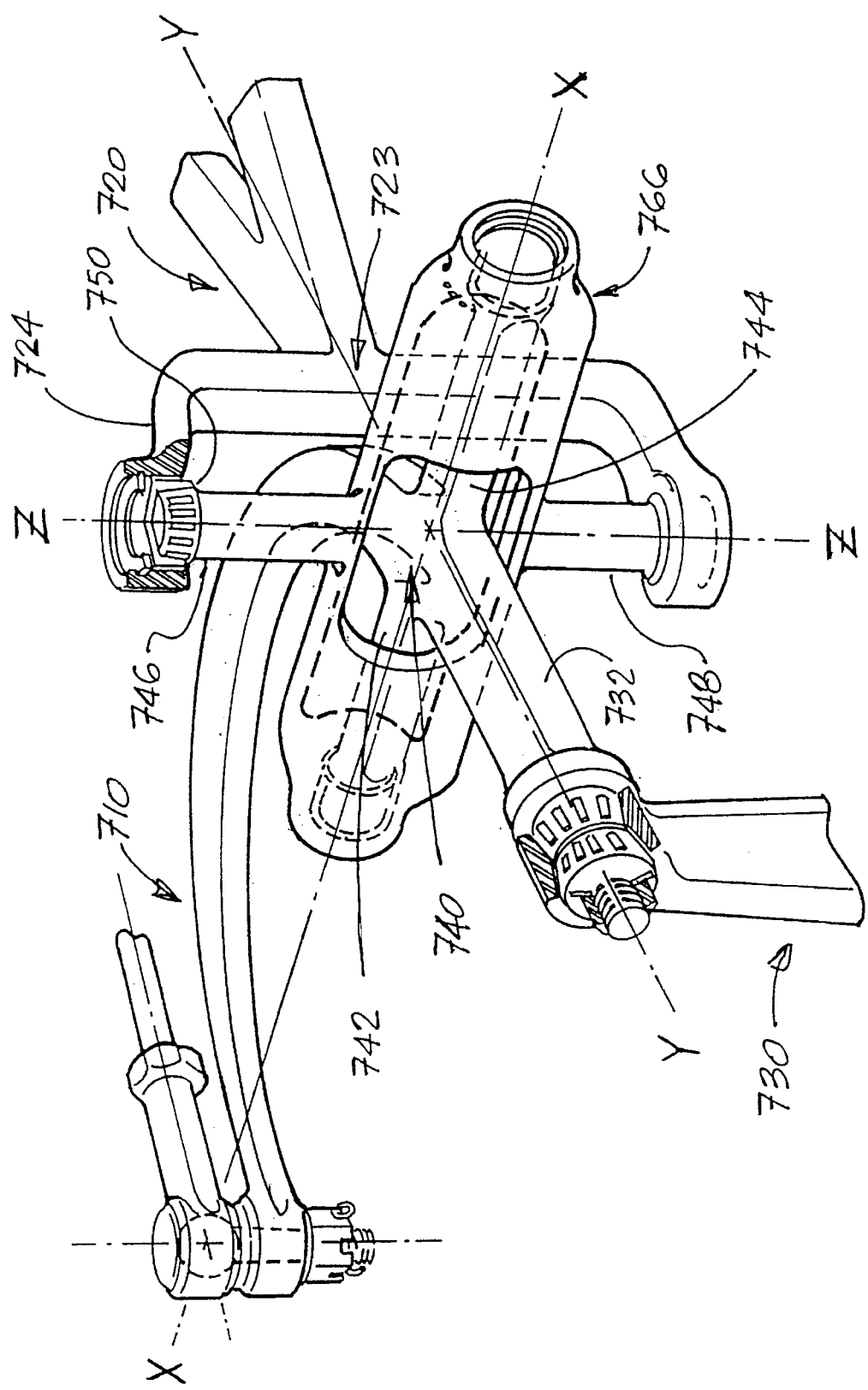
FIG. 7 is a perspective view, partially in cutaway, of one embodiment of an interconnecting arrangement for a vehicle steering and suspension mechanism.

The embodiment of FIG. 7, using reference numerals in the 700's for like components, combines the structures shown in FIGS. 2 and 3. In this arrangement, central member or trunnion 740 has a first pair of coaxial arms 742, 744 extending in the X axis direction and a single arm 732 extending in the Y axis direction. Suspension upright 730 is connected to single arm 732 as has been previously described with respect to the other embodiments.

A further member 766 extends partially about connecting member 740 and includes a pair of coaxial arms 746 and 748 which extend in the Z axis direction. Member 766 is adapted to rotatably journal coaxial arms 742 and 744 while arms 746 and 748 from member 766 are rotatably journalled within the yoke arms of yoke 723.

Figure 8:
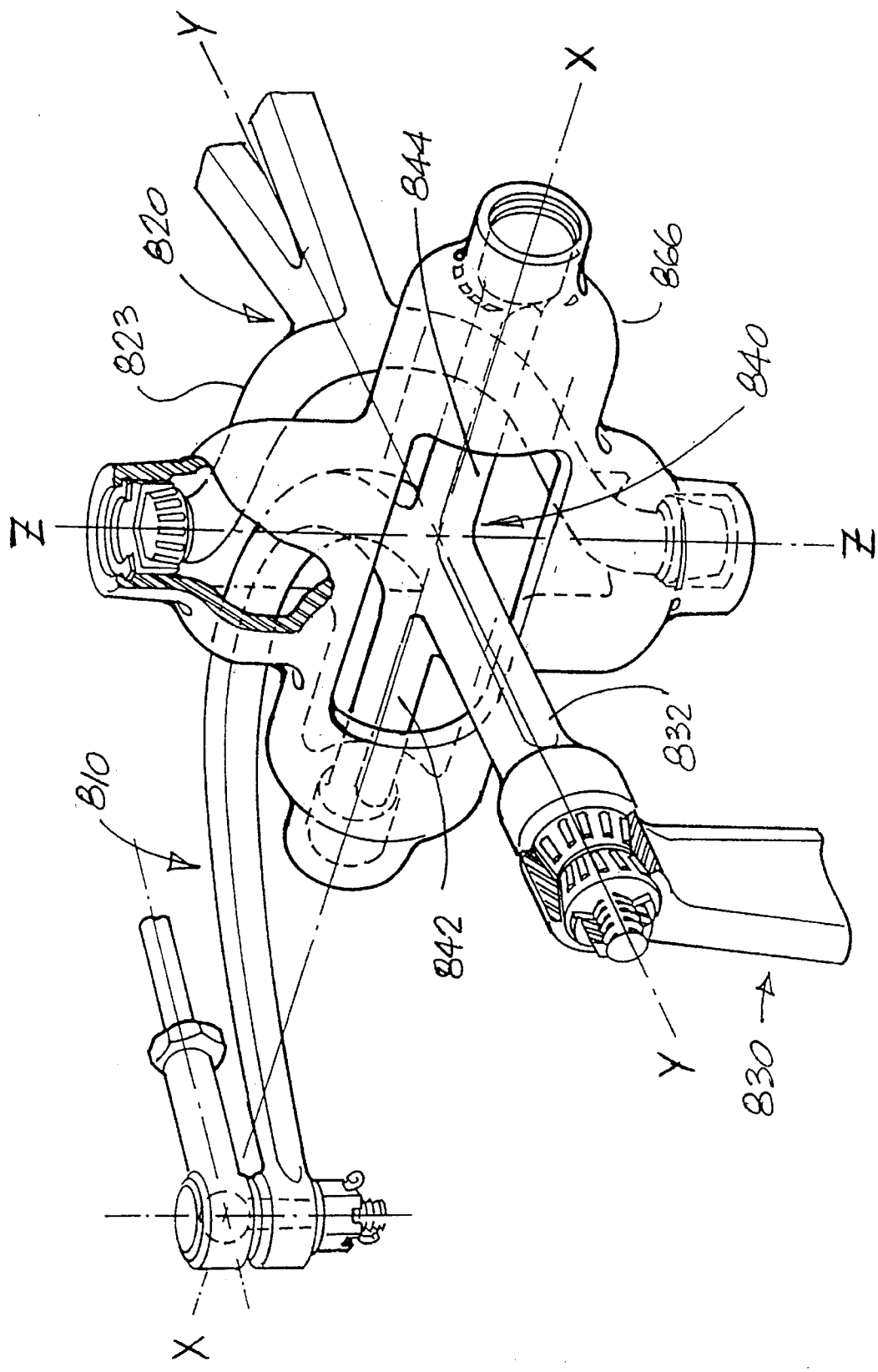
FIG. 8 is a perspective view, partially in cutaway, of one embodiment of an interconnecting arrangement for a vehicle steering and suspension mechanism.

Turning to FIG. 8, reference numerals in the 800's are employed for similar components. This embodiment is similar to that of FIG. 7, except for the arrangement of member 866 about connecting member 840. In this arrangement, yoke 823 has yoke arms which are rotatably journalled within portions of connecting member 866 as are arms 842 and 844.

In the embodiment shown in FIG. 1, the control linkage forms one of the yokes and the steering arm the other, with a laterally disposed axis freely adapted thereto for receiving the upright, all interconnected with a cross shaped trunnion. The trunnion is shown attached to the control linkage via its upended branches and to the steering arm with the laid-down ones, but if so desired, it may be oriented the other way around.

In the embodiment shown in FIG. 6, the control linkage forms one of the trunnions and the steering arm forms a yoke, with a laterally disposed axis freely adapted thereto for receiving the upright, all interconnected with a cross shaped trunnion. The trunnion is shown attached to the control linkage via its upended branches and to the steering arm with the laid-down ones, but if so desired, it may be oriented the other way around.

In the embodiment shown in FIG. 7, the control linkage ends in a generally vertical axis forming a yoke, and a laterally disposed T-shaped interconnecting member with a steering arm branching out of it has a laterally disposed axis freely adapted thereto for receiving the upright, all interconnected with a central connecting member having a cross shape with a generally horizontal yoke and a coaxial pair of lugs in the form of a trunnion mutually perpendicular to each other forming a cross. The cross shaped connecting member is shown attached to the control linkage via its upended branches and to the steering arm with the laid-down ones, but if so desired, it may be oriented the other way around.

In the embodiment shown in FIG. 8, the control linkage with a pair of coaxial lugs ends in a generally vertical axis forming a trunnion, and a laterally disposed T-shaped interconnecting member with a steering arm branching out of it has a laterally disposed axis freely adapted thereto for receiving the upright, all interconnected with a central connecting member with a pair of yokes mutually perpendicular to each other forming a cross. The cross is shown attached to the control linkage via its upended branches and to the steering arm with the laid-down ones, but if so desired, it may be oriented the other way around.

It will be understood that the above described embodiments are for purposes of illustration only and that changes and modifications may be made thereto without departing from the spirit and scope of the invention.

I claim:

1. An interconnecting arrangement for a vehicle having an upright for mounting a wheel, a control linkage and a steering arm, wherein there is a first plane having mutually perpendicular X and Y axes in said plane and a Z axis perpendicular to said plane, the arrangement comprising a connecting member, said connecting member being connected to said steering arm, upright interconnecting means connecting said upright and at least one of said steering arm and said connecting member to permit pivotable movement of said upright with respect to said interconnecting means about said Y axis, and control linkage interconnecting means connecting said control linkage and said connecting member, said control linkage interconnecting means permitting movement of said control linkage interconnecting means about said Z axis.

2. The arrangement of claim 1 wherein said connecting member has a first pair of coaxially extending arms extending in the X axis, said steering arm terminating in a yoke having a pair of yoke arms, said arms being rotatably connected to said coaxial arms.

3. The arrangement of claim 2 wherein said connecting member has a second pair of coaxially extending arms extending in the Z axis direction, said control linkage terminating in a yoke having a pair of yoke arms, said yoke arms being rotatably connected to said second pair of coaxially extending arms to permit movement of said control linkage about the Z axis.

4. The arrangement of claim 3 wherein said upright interconnecting means interconnects said upright to said yoke of said steering arm.

5. The arrangement of claim 3 wherein said upright interconnecting means comprises an arm extending from said connecting member in the Y axis, said upright being pivotably connected to said arm extending in said Y axis.

6. The arrangement of claim 1 wherein said connecting member is a trunnion having a first pair of coaxially extending arms extending in the X axis, a second pair of coaxially extending arms extending in the Z axis, said upright interconnecting means comprising a yoke member having a pair of yoke arms rotatably journalled with respect to said first pair of coaxial arms, said control linkage interconnecting means comprising a yoke having a pair of yoke arms rotatably journalled with respect to said second pair of coaxially extending arms, said steering arm being connected to said trunnion.

7. The arrangement of claim 1 wherein said connecting member has a first pair of coaxially extending arms extending in the X axis direction and a further arm extending in the Y axis direction, said upright being pivotably connected to said further arm, said steering arm terminating in a double yoke structure, said first pair of coaxial arms being rotatably journalled in said double yoke structure, said control linkage interconnecting means terminating in a trunnion having a pair of coaxial arms extending in the Z axis, said coaxial arms being rotatably journalled in said double yoke structure.

8. The arrangement of claim 1 wherein said connecting member has a first pair of coaxially extending arms extending in the X axis, said upright interconnecting means comprising a yoke having a pair of yoke arms adapted to receive said coaxial arms, said upright being pivotably connected to said yoke, a second pair of coaxial members extending from said connecting member in said Z axis, said control linkage interconnecting means comprising a trunnion having a pair of coaxial arms, said coaxial arms being rotatably journalled in said members extending in said Z axis direction.

9. The arrangement of claim 2 wherein said connecting member includes a pair of members extending outwardly in said Z axis direction, said control linkage interconnecting means comprising a trunnion having a pair of coaxial arms, said coaxial arms being rotatably journalled within said members extending in said Z axis direction.

10. The arrangement of claim 1 wherein said connecting member has a first pair of coaxially extending arms extending in the X axis, and a single arm extending in the Y axis, said upright being pivotably connected to said single arm extending in said Y axis, said steering arm being connected to said connecting member, a further member extending at least partially about said connecting member, said further member being adapted to rotatably journal said coaxial arms in the X axis, said further member having a pair of arms extending in the Z axis, said control linkage terminating in a yoke having a pair of yoke arms, said coaxial arms extending in the Z direction being rotatably journalled in said yoke arms of said control linkage.

11. The arrangement of claim 1 wherein said connecting member has a first pair of coaxially extending arms extending in the X axis and a single arm extending from said connecting member in the Y axis, said upright being pivotably connected to said single arm extending in said Y axis, said steering arm being connected to said connecting member, a further member extending at least partially about said connecting member, said further member extending at least partially about said control linkage, said control linkage terminating in a trunnion having a pair of coaxial arms in the Z axis, said further member being adapted to rotatably journal said coaxially extending arms in said X axis, and also rotatably journal said coaxial arms in the Z axis.

* * * * *